United States Patent
Christopher

Patent Number: 6,116,561
Date of Patent: Sep. 12, 2000

[54] METHOD AND APPARATUS FOR SEAT TRACK CONSTRUCTION

[75] Inventor: Hugh Charles Christopher, Nottingham, United Kingdom

[73] Assignee: Lear Corporation, Southfield, Mich.

[21] Appl. No.: 09/301,303

[22] Filed: Apr. 28, 1999

Related U.S. Application Data

[63] Continuation of application No. PCT/GB98/02558, Aug. 28, 1998.

[51] Int. Cl.[7] .................................................. F16M 13/00
[52] U.S. Cl. ...................................... 248/429; 297/216.16
[58] Field of Search .................. 248/429, 548, 248/424, 430, 903; 297/216.1, 216.16

[56] References Cited

U.S. PATENT DOCUMENTS

| | | | |
|---|---|---|---|
| 4,720,139 | 1/1988 | McSmith | 297/216 |
| 5,020,853 | 6/1991 | Babbs . | |
| 5,338,119 | 8/1994 | Bauer et al. . | |
| 5,653,506 | 8/1997 | Wisner et al. | 297/344.1 |
| 5,669,260 | 9/1997 | Stampfl . | |
| 5,676,336 | 10/1997 | Nefy et al. | 244/122 |
| 5,788,185 | 8/1998 | Hooper | 244/122 |
| 5,909,920 | 6/1999 | Dalinkiewicz | 296/24.1 |
| 5,915,660 | 6/1999 | Kanda | 248/430 |

FOREIGN PATENT DOCUMENTS

| | | |
|---|---|---|
| 076041 | 4/1983 | European Pat. Off. . |
| 1452646 | 3/1969 | Germany . |
| 37 41 427 | 6/1989 | Germany . |
| 2282551 | 4/1995 | United Kingdom . |

*Primary Examiner*—Ramon O. Ramirez
*Assistant Examiner*—Walter Landry
*Attorney, Agent, or Firm*—MacMillan, Sobanski & Todd, LLC

[57] ABSTRACT

A method and apparatus for transmitting overload forces through the structure of an automative seat track assembly, and for making such a seat track assembly provides slidably interlinked seat track profiles having enhanced bending and therefore separation resistance by virtue of an integral formed rib section which incorporates material into the section which is nominally provided from a reduced thickness portion of the profile which has been rolled to achieve material transfer, and which is subjected mainly to tension (as opposed to bending) forces during use. The resultant seat track assembly is stronger and lighter in use than conventional seat track assemblies.

24 Claims, 4 Drawing Sheets

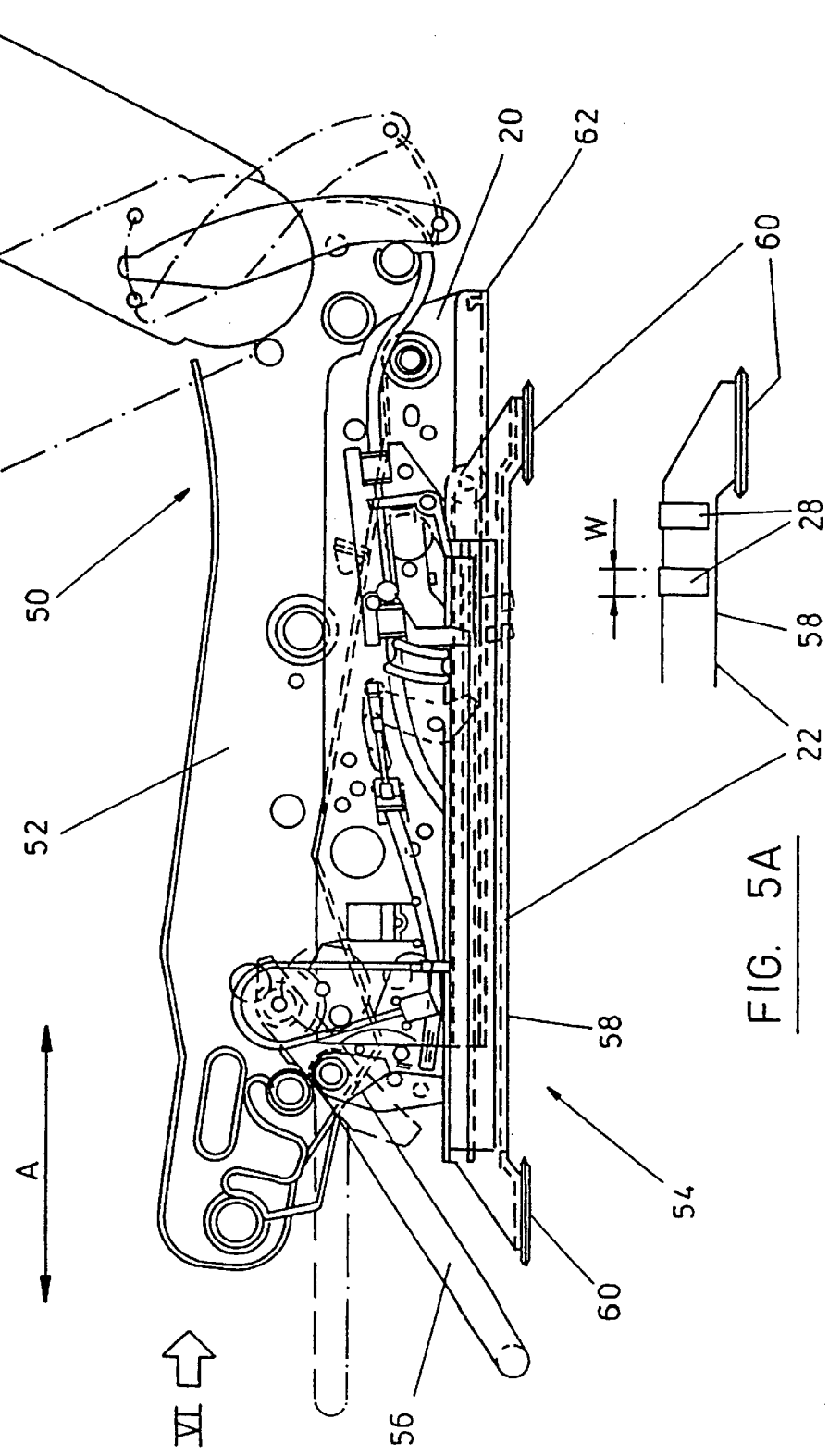

METHOD AND APPARATUS FOR SEAT TRACK CONSTRUCTION

REFERENCE TO RELATED APPLICATIONS

This application is a continuation of International Application No. PCT/GB98/02558 filed Aug. 28, 1998, which claims priority to Great Britain Patent Application No. 9718067.3 filed Aug. 28, 1997.

BACKGROUND OF THE INVENTION

This invention relates to a method and apparatus for transmitting emergency loads and is applicable to automotive seat tracks. The invention provides a method and apparatus for automotive seat track construction. More specifically, the method and apparatus of the invention is applicable to the transmission of loads in automobile seat tracks under emergency conditions in which, for example following a vehicle impact, there is a requirement for the track to transmit the maximum load which it must be capable of transmitting. Under such conditions, the seat track is designed to deform in a specific manner, that is to say the design is such that the relevant part of the seat track assembly deforms in a predetermined manner.

For this purpose, the seat track design is such that defined parts must not deform (ie must have sufficient strength) before other elements of the seat track design. This includes parts of the seat track which, by virtue of their inherent shape or geometry or mechanical relationship with other components, are subjected to significantly greater stresses than other parts. For example, it may be necessary for certain parts of a basically two-part sliding seat track assembly to resist bending under emergency conditions up to a predetermined load.

We have determined that the particular load requirements of automotive seat tracks, which include a relatively complex intermix of bending and tension forces, is susceptible to a design approach (as defined in the claims hereto) whereby the relatively high bending strength requirements are related to the corresponding tension-resisting requirements in such a way that an integrated design structure is obtained which is capable of meeting the design requirements in respect of overall strength to meet overload conditions in an improved manner with respect to currently available designs, and an object of the present invention is provide improvements in one or more of these respects, or indeed improvements generally.

There is disclosed in GB-A-2,282,551 (Mercedes-Benz) a process for producing a metal sheet which may be used in the fabrication of motor vehicle bodies and which sheet is stepped in cross-section. The method utilises an extruded profile having differing wall thicknesses which is rolled from the hollow circular profile shown in FIG. 3 to produce after cutting, the profiles shown in FIGS. 1 and 2.

There is disclosed in U.S. Pat. No. 5,338,119 (Hammerstein GmbH) a seat slide for vehicle seats in which the tracks are manufactured of steel sheet containing at least 0.35% carbon content and which are heat treated after completion. The tracks have a substantially higher fundamental strength than otherwise so that less material and thus lower weight can be achieved.

There is disclosed in CA-A-2,172,876 (Stampfl) a method of manufacturing a c-shaped rail by a rolling technique in which the outward migration of material during the rolling operation is offset by a subsequent rolling step using calibrating discs to return the marginal sections to their original thickness.

SUMMARY OF THE INVENTION

According to the invention there is provided a method and apparatus for transmitting loads under overload conditions as defined in the accompanying claims.

In an embodiment of the invention described below, the method and apparatus of the invention provides a seat track structure in which, under overload conditions, the overload stresses are transmitted through inter-engaging components which are subjected to bending stresses, and the bending-stress-subjected components incorporate enhanced bend-resistance by the provision of additional strength material in the form of a bend-resisting rib structure which provides enhanced stiffness. However, in the same embodiments, the additional material provided in the stiffness rib is, at least in part provided from a related portion of the structure in which reduced or negligible bend resistance is required and that part of the structure is required only to transmit as its main structural requirement, tension loads.

Thus it can be seen that there is a co-operative inter-relationship between the bend-resistant portions of the seat structure and those subjected mainly to tension forces whereby additional material is provided for bend-resistance, this material nominally being provided from the portions of the structure which have a lower stiffness equirement.

In the embodiment, this nominal material transfer is effective in the original equipment manufacturing stage by appropriate press-forming techniques including rolling and other forming steps to reduce material thickness in those portions of the assembly which are mainly required to be resistant to tension loads and to increase stiffness by means of press-formed stiffeners elsewhere, whereby the economy of material thus achieved makes available material for the enhancement of stiffness in the bend-resisting portions of the structure.

Of course, in the embodiment, the direct transfer of the material from one rolling operation to a fabrication technique performed on a related portion of the structure is not usually possible and the economies of material thereby effected are to be viewed in terms of the overall cost-effectiveness of the manufacturing and forming technique.

Of course also, rolling operations leading to material gauge reduction are a relatively commonplace step, and this aspect of the present invention seeks only to use such steps as part of a method and apparatus in which the arrangements for the transmission of emergency and other overload forces are provided such that the force path through the seat track assembly includes, in series, at least one portion of reduced bending resistance and thickness, together with at least one portion in which additional material has been provided to increase the bend resistance to a level above that of the mean or nominal material.

A further aspect of the present invention provides a method and apparatus applicable to an automotive seat track system wherein a substantial differential in track section stiffness between different portions of a given track section is provided by reduction in one portion of the track profile from a given nominal thickness and stiffness (defined by the standard stiffness of the track section base material), and wherein at least one other portion of the section (which, under overload conditions, is subjected to bending forces) is provided with a level of stiffness above said given nominal or base stiffness by a formed reinforcement providing additional sectional material, and said one track profile portion (which has reduced stiffness) being one which, under overload conditions, is subjected mainly to tension rather than bending forces and at overload transmits such overload forces through a section profile of reduced thickness, whereby, at overload, overload forces are transmitted through portions of said seat track section profile having below base, and base and above base bending resistance.

In the embodiment, the provision of the substantial stiffness differential varying from below base, to base, to above base, enables, in a manner not previously available, the matching of strength and stiffness to the widely differing strength and stiffness requirements of seat track sections with their very particular strength requirements arising from automotive use conditions, notably impact strength requirements.

According to a still further aspect of the invention, there is provided a method of making an automotive seat track section comprising forming the seat track section from a section base material having a base stiffness and strength, the method being characterised by the step of producing differential section stiffness by the steps of effecting nominal material transfer from one portion of the seat section (which mainly requires resistance to tension forces under overload conditions in use) to another portion of the section (which requires resistance to bending under overload conditions in use), so as to achieve a resultant section which incorporates portions having below base, and base, and above base resistance to bending, said material transfer being effected by forming (eg rolling) said one portion so as to have a reduced thickness and by providing material (for example in the form of a rib) secured to or integral with said other portion.

The method and apparatus of the invention provides a technique of nominal material transfer which to the best of the applicants' knowledge has never previously been utilised to meet the particular strength requirement of automotive seat tracks. In this respect, the invention represents a new approach to seat track section construction in which the nominal or base section gauge no longer represents a design constraint imposing excessive bend resistance where none or only a modest level is required and dictating a requirement for excessive or undue section gauge in parts of the section which have no such requirements merely because under overload conditions certain portions of the sections are subjected to high bending loads.

By adopting a technique of material transfer, the invention accommodates the strengths and bending resistance requirements of the seat track profile in a cost- and materials-effective manner.

A further aspect of the invention relates to a further aspect of the question of the strength-to-weight ratio for automotive seat track sections.

The particularities of the intermix of loading and weight and space requirements for automotive seat track sections has already been touched-on above.

Automotive vehicle makers impose stringent requirements with respect to weight and strength, these including of course the overload situations where the vehicle seats transfer to the seat track substantial loads originating in passenger body mass which is transmitted to the seat structure through the seat belt system or other restraint means.

Attempts in the past to improve the strength-to-weight ratio have (we have noticed) always taken the view that the only way to make advances in this particular respect (having regard to seat track design constraints) is to use lighter materials such as aluminum.

We however have discovered that within the field of seat tracks, advantage can be taken of the nature of the material from which such tracks are fabricated and formed or otherwise made. The material itself is rolled steel sheet and in this regard it is particularly significant that the individual seat track sections are produced from substantial lengths of such sheet steel by stamping or otherwise cutting the sheet so that individual track sections extend lengthwise of the sheet, rather than transverse of its length. As a result, we have realised, it is possible to roll and form the raw steel sheet material so that it has lengthwise extending areas of differing gauge and thus differing stiffness, and/or such areas with and without formed stiffeners. By arranging matters so that zones of reduced stiffness are matched with the zones in the seat track section which, along the length of the track, require reduced stiffness (and we have discovered that some portions require substantially only an ability to resist or transmit tension forces), there can be provided very substantial savings of material and thus of weight. Likewise, by correspondingly matching the provision of stiffeners or ribs likewise to the stiffness requirements, a similar result can be achieved, as more fully described below.

In simple terms, after allowing for the intrinsically high strength proprieties of steel as compared with aluminum, and after allowing for the weight savings discussed above, the end result is that the track section can achieve advances in terms of strength-to-weight ratio which had hitherto been thought to be achievable only by use of aluminum.

In other words, by use of this technique involving merely the use of appropriately positionally (on the steel strip) located rolling and/or forming steps in the production of the steel strip (the cost of which rolling and/or forming steps is an extremely modest addition) there can be achieved weight-to-strength ratio advances which are in some respects comparable to those which might be achieved by changing to a completely different material such as aluminum. For such a step to be taken in relation to a specific component such as a seat track, is believed to be an important technical step.

A still further aspect of the invention relates to those parts of the seat track sections which require stiffness to resist overload forces encountered in use. Such forces have been discussed above and in accordance with this present aspect of the invention an approach to improving the cost-to-weight and strength-to-weight ratios for a seat track section may be obtained by differential localised stiffening of the section in accordance with the differential stiffness and weight functions achieved in accordance with the inventive concept discussed above by means of section rolling.

In accordance with the present aspect of the invention, the method of the invention provides the requisite strength-to-weight ratio in an automotive seat track section by the provision of enhanced stiffness in track section portions requiring bend resistance (such as interfitting track slide flange formations), while other portions of the section are fabricated from steel strip having a reduced gauge which corresponds to the provision of a sufficient level of strength/stiffness to accommodate the mainly tension-resistant requirements of portions of the seat track not included in the profiled and interfitting slidable track section portions.

In other words, in accordance with this approach it is feasible to adopt the use of steel strip as the starting material for the track section manufacturing process, the gauge of which is very significantly reduced with respect to that which has always hitherto been adopted, whereby the weight and cost penalties imposed by the previous tacit acceptance of a uniform heavy gauge steel provision are reversed and the section is provided with the requisite strength/stiffness by use of localised reinforcements such as ribs never previously used in seat track sections, and elsewhere the seat track section is of relatively light gauge construction while nevertheless being able to accommodate the mainly tensile loads imposed during use. As a result, the strength-to-weight ratio is greatly improved in a manner corresponding to that which had hitherto been thought to require the use of sophisticated high strength/low density alloys or the like, and such is achieved without the need for any more unusual technical steps than the use of well known rolling and forming processes.

These advances are achieved significantly more economically and to far greater effect (in terms of improved cost-and-strength-to-weight ratios) than could be achieved by conventional techniques such as welding.

BRIEF DESCRIPTION OF THE DRAWINGS

An embodiment of the invention will now be described by way of example with reference to the accompanying drawings in which:

FIG. 1 showing only an upper portion of the section and includes in dotted-line representation, an indication of an associated track section which co-operates with it;

FIG. 3 also shows a generally horizontal mounting portion of the section which is adapted to co-operate with a floor support and fixing;

FIG. 5 shows a side elevation view of a seat and seat track assembly, and FIG. 5A shows a simplified scrap view taken from FIG. 5 showing the location of a pair of formed stiffeners provided on the fixed track section;

DETAILED DESCRIPTION OF THE PREFERRED EMBODIMENT

Figure 1:
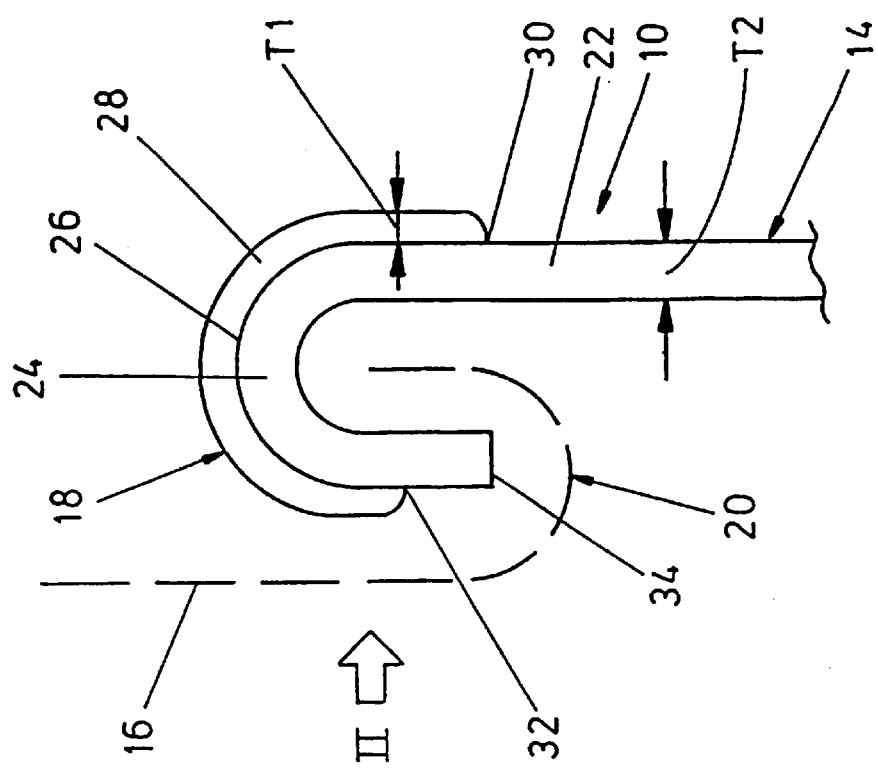
FIG. 1 shows, on an enlarged scale, a section taken generally at right angles to the longitudinal extent of a seat track section.

As shown in the drawings, apparatus for transmitting overload forces through the structure of an automotive seat track assembly comprises a modified seat track assembly including the structure shown in FIGS. 1 to 4 of the accompanying drawings. The structures shown in FIGS. 1 to 4 indicate the general structure and arrangement of the fixed track section of a pair of track sections. The fixed track section is adapted to be mounted on an automotive body structure. The slidable track section (which in the accompanying drawings is indicated by a chain-dot line) is adapted to have an automotive seat (not shown) secured to it.

We hereby incorporate into the disclosure of the present application the entire text and drawings of our European patents EP-B-0 076 041 (reference MKII slide ref DC48/50) and EP-B-0 411 850 (reference Seat Slide Position Memory ref DC01247). These prior specifications disclose further technical matter relating to the general structure and arrangement of a suitable automotive seat track assembly to which the present invention is applicable and the disclosure in the present application is supplemented by that disclosure.

Thus, in the accompanying drawings, the apparatus 10 for transmitting overload forces through the automotive seat track assembly 12 forms part of that assembly and comprises a pair of seat track assemblies (only one indicated) which are mounted in parallel relationship to slidably mount an automotive seat (not shown) on an automotive body structure (not shown). Each of the seat track assemblies 12 comprises a fixed track assembly 14 to be mounted on the automotive body structure, and a slidable track section 16, to which the automotive seat is to be secured.

The fixed and slidable track sections 14, 16 are in mutual slidable engagement with their interengaging profiles 18, 20 being so formed by bending that the profiles interlink and resist separation under the action of overload forces applied between them during vehicle impact. Such forces arise of course from the weight of a person sitting in the seat and are transmitted thereto through the contact between the person and the seat, and restraint system loads.

In use, the main forces exerted on the seat track assembly under overload conditions, for example at the time of an impact, are directed lengthwise of the seat track, but such forces have components acting in directions non-lengthwise, which components exert substantial separating forces acting between the fixed and slidable seat track sections 14 and 16.

Fixed track section 14 comprises a formed steel section comprising an upstanding wall portion 22 which, in use, is generally vertical. The wall portion 22 has formed integrally therewith its corresponding profile 18 (which interengages with the sliding profile 20) and is in the form of a generally inverted U-section 24. The structure of the slidable track section 16 in its profile portion 20 is similar.

Figure 2:
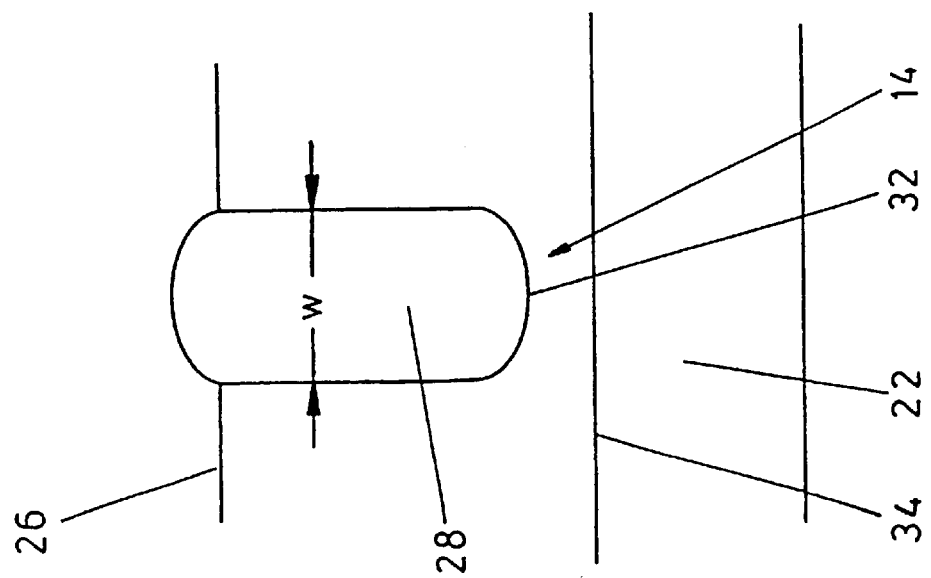
FIG. 2 shows a side elevation view of the seat track section of FIG. 1, as seen generally in the direction indicated by arrow II in FIG. 1, showing the location of a formed stiffening rib.

As shown in FIG. 2, wall portion 22 has an upper edge 26 extending lengthwise of the track section, and which is constituted by the top edge of the U-section profile.

In accordance with the invention, there is press-formed a stiffening rib 28 which serves to enhance the bend-resisting stiffness of U-section portion 24 of fixed track section 14. Stiffening rib 28 is formed so as to extend around the U-section 24 from an inner end edge 30 to an outer end edge 32 located slightly above the corresponding edge 34 of U-section 24.

As FIG. 2 shows, rib 28 is of a width W which is chosen according to the stiffening requirements in question. In this embodiment the width of the rib occupies only a relatively minor proportion of the longitudinal extent of the seat track assembly. A significantly wider rib may be employed where required.

The structure of rib 28 comprises a pre-formed structure which is integrally formed on the main body of the steel strip from which track 14 is to be manufactured, during which manufacture the main body is profiled and apertured and otherwise formed to co-operate with its adjacent structures in use. A series of ribs 28 will usually be provided at lengthwise-spaced intervals along the longitudinal extent of a track section, the number depending upon the required stiffness.

As can be seen in FIG. 1, the cross-sectional thickness of stiffening rib 28 is comparable to, but somewhat less than that of the basic (or unaltered) thickness of the material of wall portion 22. This thickness is the base thickness of the raw material steel sheet from which the track sections are fabricated. Preferably, the thickness T1 of the rib 28 lies in the range from 25 per cent to 100 per cent of the corresponding thickness T2 of the base material of wall portion 22.

Figure 4:
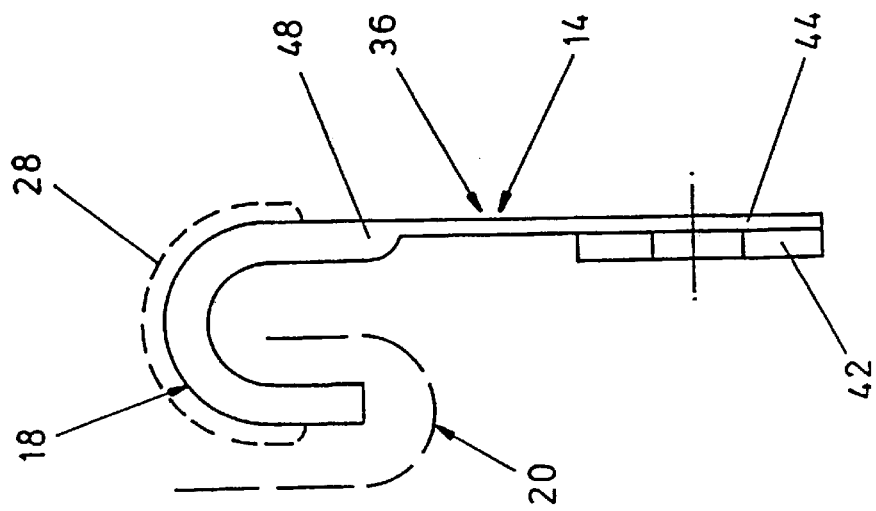
FIG. 4 show, in a sectional view similar to that of FIG. 3, a further embodiment in which the track section is adapted for mounting on a generally vertical face of the vehicle.
Figure 3:
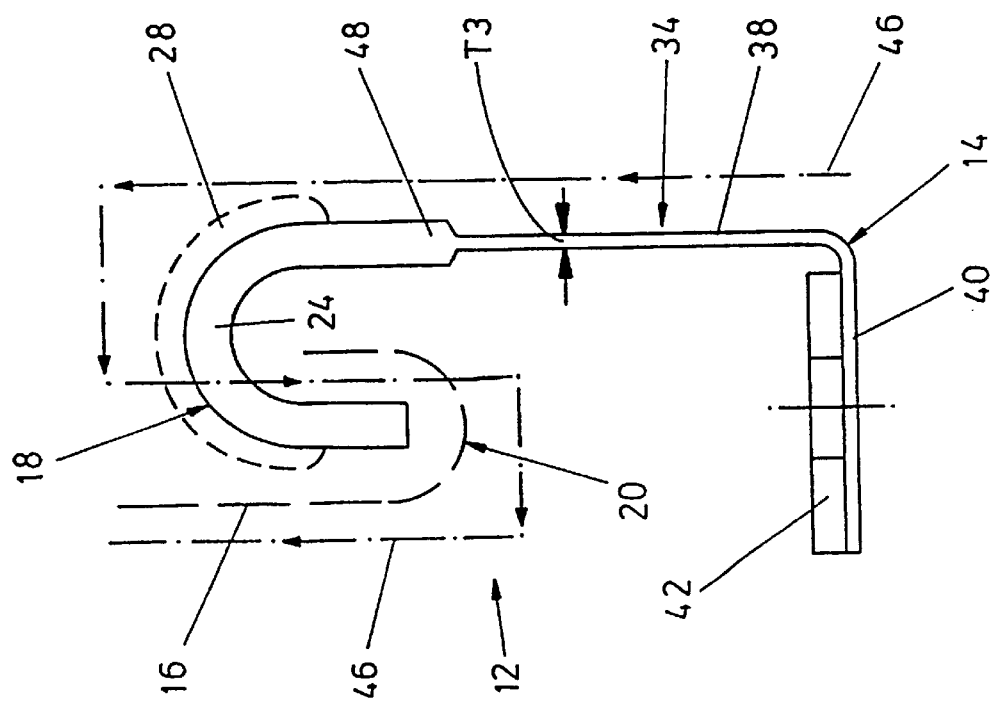
FIG. 3 shows, in a view generally similar to that of FIG. 1, a section through the track section showing a reduced thickness portion of the track section which is subjected mainly to tension forces as opposed to the bending forces which are applied in the upper portion of the section.

Turning now to the constructions shown in FIGS. 3 and 4, these figures show the lower portion of the seat track assembly in which the interengaging profiles 18, 20 are connected to the vehicle itself through mounting structures 34, 36.

In the embodiment of FIG. 3, mounting structure 34 comprises a reduced thickness wall portion 38 of which the thickness T3 is substantially reduced with respect to the base wall thickness T2 (see FIG. 1). This thickness reduction is effected by a rolling operation and results in a material saving which corresponds, but not in exact amount, with the material utilised in the stiffening ribs 28 employed for enhancing the stiffness of U-section 24.

The ratio T2/T3 preferably lies in the range from 2 to 10, the still more preferred range being from 4 to 8.

As shown in FIG. 3, a mounting flange 40 is formed as a generally right-angled bracket to co-operate with a local support 32 for floor fixing of the track assembly.

In the FIG. 4 embodiment, mounting flange 40 is formed as an integral flange 44, likewise to co-operate with local support 42, but in this case to provide a face-mounting arrangement.

In FIG. 3, there has been shown in a dotted-line manner, an indication of the presence of stiffening rib 28, and a similar rib provision is made in FIG. 4, although not shown therein. In these embodiments, the concept of material transfer by rolling and press-forming operations from the reduced thickness portion 36, 38 to the rib portions 28 can be readily seen.

In use, the force path under overload is indicated by broken line 46 and extends from mounting flange 40 through (mainly tension-resisting) thin wall portion 38, and through base thickness portion 48, and through stiffened (bend-resistant) U-section 24, and corresponding profile 20 (which may also have a stiffening rib).

In the embodiments, the portions of the seat track assembly which require the higher level of stiffness/strength in accordance with the teachings of the invention are the portions which are profiled/shaped for interfitting and relative (to each other) sliding relationship (whether with rollers/bearings or not). The most clearly identifiable portion of the seat track assembly which has the lower strength and stiffness requirements (mainly to resist tension forces) is the upstanding portion of the seat track assembly to which the seat itself and the seat belt anchorages etc are attached. This upstanding portion typically has a length dimension (extending lengthwise of the seat track) of about 450 to 500 centimeters, and a height or width dimension (extending generally upwardly from the sliding interfitting flange portions of the track) of about 70 to 140 centimeters, depending upon the exact (often non-linear) upper profile and related factors.

In a typical embodiment, the finished seat track assembly is a fabrication in which the upstanding portion of the track is itself welded along its lower edge to a lengthwise-extending and laterally-projecting flange, which mirrors its own lower edge profile so as to produce a generally symmetrical bifurcated lower edge profile for balanced co-operation with the adjacent fixed track structure through ball or roller bearings.

Figures 6, 6A:
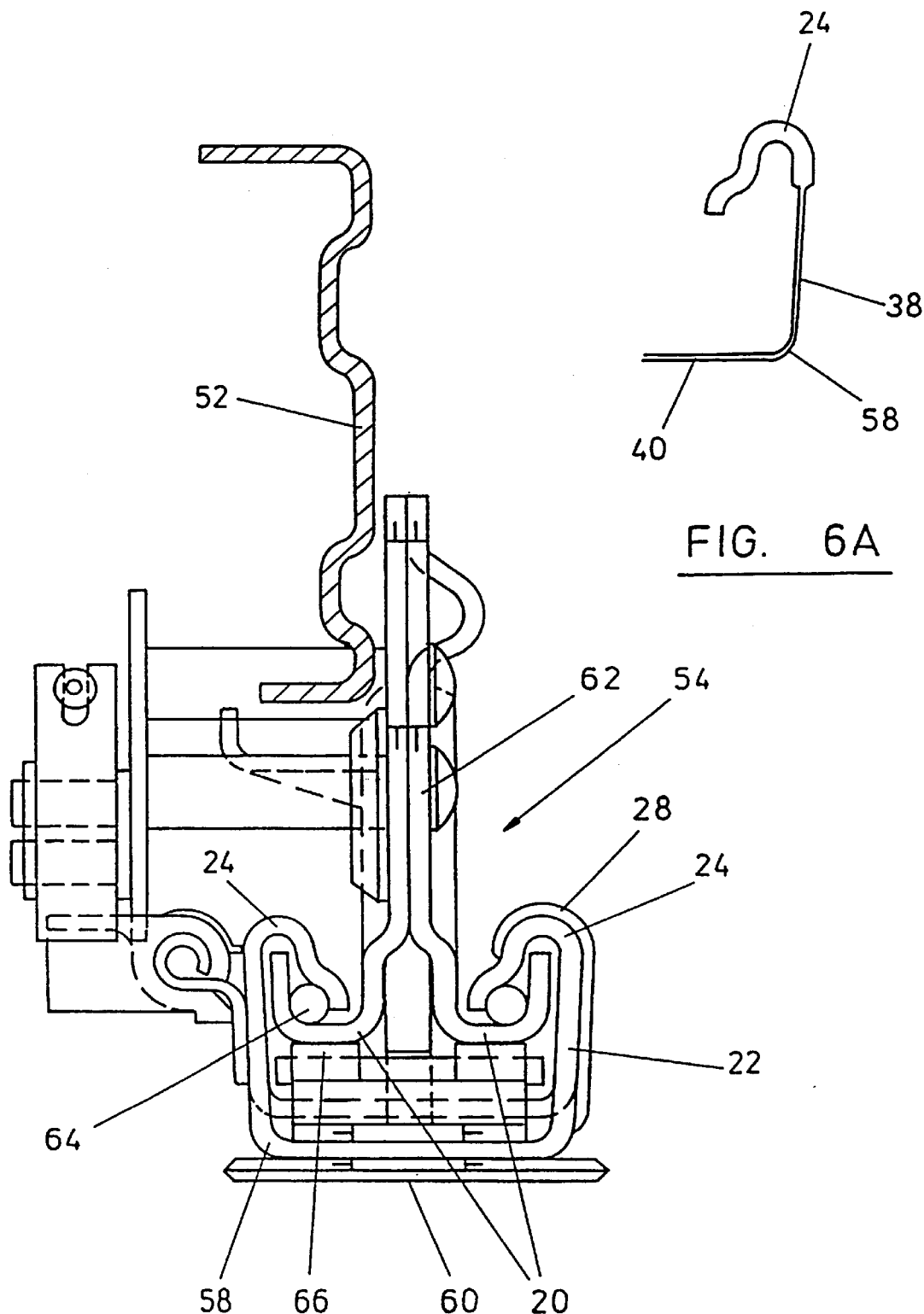
FIG. 6 shows, on a larger scale, an end elevation view of the assembly of FIG. 5 as seen in the direction indicated by arrow VI in FIG. 5.
FIG. 6A shows a scrap view of a portion of the assembly of FIG. 6 illustrating a modification in which instead of the use of the stiffening ribs of FIGS. 5A and 6 there is employed a heavier gauge steel section and this is rolled thinner where the extra stiffness is not required.

Turning now to the embodiments of FIGS. 5 and 5A and 6 and 6A, these show in FIGS. 5 and 6 the structure of a seat and seat track assembly as disclosed in our above-mentioned EP '850 specification relating to seat slide position memory, which is incorporated in the present application merely as an example of a typical seat structure to which the present invention may be applied.

In FIGS. 5, 5A, 6 and 6A the reference numerals adopted correspond to those in the embodiment of FIGS. 1 to 4 since the present embodiments illustrate in more structural detail the application of the principles of the preceding embodiments.

Thus in FIGS. 5, 5A, 6 and 6A there is shown a vehicle seat 50 having a seat body structure 52 and which is mounted for lengthwise position adjustment in direction A by means of a seat track assembly 54 under the control of a passenger-operated release lever 56.

Seat track assembly 54 includes a fixed track section 58 connected to the vehicle floor through feet 60, and a slidable track section 62 to which seat body 52 is connected. Of course, the structure is duplicated at laterally spaced locations across the vehicle width so as to provide a pair of spaced tracks on which the seat 50 slides.

In FIGS. 5 to 6A, fixed seat track 58 has been identified also by reference numeral 22 to correspond with the reference numerals adopted in the preceding embodiment, and likewise slidable track section 62 is also identified by reference numeral 20 for the same reason. The fixed and sliding track sections are interconnected by ball bearings 64 and rollers 66 likewise serve to mount the slidable track section 62 for free sliding movement.

Turning now to the features shown in FIGS. 5, 5A, 6 and 6A relating to the present invention, there can be seen in FIG. 5A the location of the formed stiffening ribs 28. As shown in FIG. 5A, the width W of each of the ribs 28 is 15 millimetres, with a spacing between the ribs of similar or slightly greater magnitude. The ribs are provided along the lengthwise extent of the fixed track section 58, but it may not be necessary to provide the ribs throughout its length.

Turning now to FIGS. 6 and 6A, these show the relationship of the stiffening ribs 28 to the remaining structure of the seat track assembly 54 and it is to be understood that the ribs 28 are provided at both sides of each of the fixed tracks 58, though only shown in FIG. 6 at the outer or right-hand profile 24.

The ribs 28 extend as shown in FIG. 6 around the curved profile 24 and downwardly across the full width of the side wall portion (marked 22 in FIG. 6) of fixed track section 58, almost to the location of the track feet 60, thus providing a stiffening function across the sidewall portion (at both sides of the track) whereby the gauge of the steel section from which the track is formed can be significantly reduced.

Although in FIG. 6 the ribs have been shown as extending across the sidewall portion 22 of the fixed track section 58, the main stiffening function of the ribs is in relation to the interengaging curved profile portions of the seat track sections which are identified in FIG. 6 by the reference numerals 20 and 24. Accordingly, the sidewall portion and the lower base or attachment portion 38 and 40, respectively, as shown in FIG. 6A require only significantly reduced stiffness and, as shown in FIG. 6A, it is these portions which in accordance with the principles of the invention may be rolled to a reduced thickness whereby the upper portion 24 remains of sufficient gauge and stiffness to provide the required overload resistance function. Of course, the curved profile 24 may be formed with stiffening ribs as a supplement to a chosen gauge and stiffness of steel base strip from which the track sections are formed.

What is claimed is:

1. Apparatus for transmitting overload forces through the structure of an automotive seat track assembly comprising:
    a) a pair of seat track assemblies to slidably mount an automotive seat on an automotive body structure;
    b) each of said seat track assemblies providing a fixed track section to be mounted on said automotive body structure, and a slidable track section to which an automotive seat is to be secured;
    c) said fixed and slidable track sections being adapted to be assembled in mutually slidable engagement with interengaging profiles so formed by bending that the profiles interlink and resist separation under the action of overload forces applied in the direction arising during vehicle impact by virtue of the resistance of said profiles to bending;
    d) said apparatus being adapted to transmit said overload forces through said seat track assembly by application of said forces thereto between said interlinked profiles; characterised by
    e) said apparatus being adapted to transmit said overload forces through said track sections via a force path including portions in the path disposed in series which include portions of reduced and of unchanged and/or of unchanged and of enhanced resistance to bending with respect to the bending resistance of the base material from which said track sections are formed, said portions of enhanced bending resistance including said interlinked profiles.

2. The apparatus of claim 1, wherein said portions of reduced and of unchanged and/or unchanged and of enhanced resistance to bending comprise formed integral portions of differing stiffness and located in at least one of said seat track sections to respond to the differences in bending stiffness required in different portions of said track.

3. The apparatus of claim 2, wherein said integral portions of differing stiffness are formed by effecting nominal material transfer from one portion of said seat track section to another portion thereof.

4. The apparatus of claim 3, wherein said seat track sections are formed from a sheet material formed in lengths substantially greater than the length of said seat track section such that said sheet material is rolled to form first and second lengthwise-extending zones of differing gauge and thus differing stiffness.

5. The apparatus of claim 4, wherein said first zone is of lesser stiffness than said second zone, said first zone being used to form at least part of connecting and mounting portions of said seat tracks which requires mainly an ability to resist tension forces, said second zone being used to form shaped and interfitting portions defining a slide which permits lengthwise sliding movement of said seat tracks relative to one another.

6. The apparatus of claim 3, wherein said seat track sections are formed from a sheet material formed in lengths substantially greater than the length of said seat track section such that said sheet material is rolled to form first and second lengthwise-extending zones of differing stiffness by forming stiffening elements at locations so as to produce zones of greater stiffness.

7. The apparatus of claim 6, wherein said first zone is of lesser stiffness than said second zone, said first zone being used to form at least part of connecting and mounting portions of said seat tracks which requires mainly an ability to resist tension forces, said second zone being used to form shaped and interfitting portions defining a slide which permits lengthwise sliding movement of said seat tracks relative to one another.

8. The apparatus of claim 6, wherein said stiffening elements are formed as discrete elements at locations spaced apart lengthwise of said sheet.

9. The apparatus of claim 6, wherein said stiffening elements comprise press or roll-formed reinforcement ribs.

10. The apparatus of claim 9, wherein each said seat track has at least two of said stiffening elements.

11. The apparatus of claim 2, wherein the material transfer is effected by forming said one portion so as to have a reduced thickness.

12. The apparatus of claim 2, wherein the material transfer is effected by providing material integral with said other portion.

13. A method of making an automotive seat track section comprising the steps of:
    a) providing a base material for forming a pair of seat track assemblies for slidably mounting an automotive seat on an automotive body structure, wherein each of the seat track assemblies includes a fixed track section for mounting on the automotive body structure, and a slidable track section for mounting on the automotive seat; and
    b) bending the fixed and slidable track sections to form interengaging profiles such that the profiles interlink and resist separation under the action of overload forces applied in the direction arising during vehicle impact by virtue of the resistance of said profiles to bending, wherein the overload forces are transmitted through the track sections via a force path including portions in the path disposed in series which include at least one of a first and second combination, wherein the first combination is a portion including reduced and unchanged resistance to bending, and the second combination is a portion including unchanged and of enhanced resistance to bending with respect to the bending resistance of the base material from which the track sections are formed.

14. The method of claim 13 comprising forming integral portions of differing stiffness in one of the first and second combination portions, the integral portions being located in at least one of the seat track sections to respond to the differences in bending stiffness in different portions of the track.

15. The method of claim 14 comprising forming the integral portions by effecting nominal material transfer from one portion of the seat section to another portion thereof.

16. The method of claim 15 comprising forming the seat track sections from sheet material formed in lengths substantially greater than the length of said seat track section such that said sheet material is rolled to form first and second lengthwise-extending zones of differing gauge and thus differing stiffness.

17. The method of claim 16, wherein said first zone is of lesser stiffness than said second zone, said first zone being used to form at least part of connecting and mounting portions of said seat tracks which requires mainly an ability to resist tension forces, said second zone being used to form shaped and interfitting portions defining a slide which permits lengthwise sliding movement of said seat tracks relative to one another.

18. The method of claim 15 comprising forming the seat tracks from a sheet material in lengths substantially greater than the length of said seat track section such that said sheet material is rolled to form first and second lengthwise-extending zones of differing stiffness by forming stiffening elements at locations so as to produce zones of greater stiffness.

19. The method of claim 18, wherein said first zone is of lesser stiffness than said second zone, said first zone being used to form at least part of connecting and mounting portions of said seat tracks which requires mainly an ability to resist tension forces, said second zone being used to form shaped and interfitting portions defining a slide which permits lengthwise sliding movement of said seat tracks relative to one another.

20. The method of claim 18 comprising forming stiffening elements as discrete elements at locations spaced apart lengthwise of the sheet.

21. The method of claim 18 comprising forming the stiffening elements as press or roll-formed reinforcement ribs.

22. The method of claim 21, wherein each seat track is formed with at least two stiffening elements.

23. The method of claim 15 comprising forming the one portion so as to have a reduced thickness.

24. The method of claim 15, wherein the material transfer is effected by providing material integral with said other portion.

* * * * *